US005545459A

United States Patent [19]

Chang

[11] Patent Number: 5,545,459

[45] Date of Patent: Aug. 13, 1996

[54] BUSINESS FORMS HAVING DUAL-FUNCTIONAL COATING

[75] Inventor: John C. H. Chang, Naperville, Ill.

[73] Assignee: Wallace Computer Services, Inc., Hillside, Ill.

[21] Appl. No.: 375,706

[22] Filed: Jan. 20, 1995

[51] Int. Cl.[6] .............................. B32B 3/04; B65D 27/18

[52] U.S. Cl. .......................... 428/121; 428/137; 428/176; 428/340; 229/92.7

[58] Field of Search .................................... 428/137, 121, 428/176, 340

[56] References Cited

U.S. PATENT DOCUMENTS

| | | | |
|---|---|---|---|
| 2,855,324 | 10/1958 | Van Dorn | 117/25 |
| 3,104,799 | 9/1963 | Steidinger | 229/69 |
| 3,130,064 | 4/1964 | Insalaco | 117/17.5 |
| 4,095,695 | 6/1978 | Steidinger | 206/610 |
| 4,102,251 | 7/1978 | Steidinger | 93/63 M |
| 4,254,201 | 3/1981 | Sawai et al. | 430/111 |
| 4,338,414 | 7/1982 | Acharya et al. | 525/193 |
| 4,499,168 | 2/1985 | Mitsuhashi | 430/99 |
| 4,510,225 | 4/1985 | Kuehnle et al. | 430/126 |
| 4,754,915 | 7/1988 | Steidinger | 229/92.7 |
| 4,889,278 | 12/1989 | Steidinger | 229/92.1 |
| 4,944,449 | 7/1990 | Schmidt | 229/73 |
| 5,017,416 | 5/1991 | Imperial et al. | 428/195 |
| 5,045,426 | 9/1991 | Maierson et al. | 430/126 |
| 5,095,682 | 3/1992 | Steidinger | 53/411 |
| 5,102,737 | 4/1992 | Josephy et al. | 428/411.1 |
| 5,281,570 | 1/1994 | Hasegawa et al. | 503/216 |
| 5,282,651 | 2/1994 | Alonso | 283/117 |

OTHER PUBLICATIONS

Abstract, Derwent #010314473, Lakes (Inventor) CA2117714A, Apr. 16, 1995.

*Primary Examiner*—P. C. Sluby
*Attorney, Agent, or Firm*—Roylance, Abrams, Berdo & Goodman, L.L.P.

[57] ABSTRACT

A business form comprising a substrate with at least one surface bearing a dual-functional coating comprising a copolymer of ethylene and vinyl acetate containing at least 40 weight percent ethylene and having a softening point of at least 60° C. enhances adhesion of toner particles and is self-adhering under application of heat and pressure.

25 Claims, 9 Drawing Sheets

BUSINESS FORMS HAVING DUAL-FUNCTIONAL COATING

FIELD OF THE INVENTION

This invention relates to a dual-functional coating for business forms which can enhance toner anchorage and render such forms self-adhering, to business forms having such dual-functional coatings, and to the use of such forms. More particularly, this invention relates to mailer forms having a dual-functional coating of ethylene-vinyl acetate copolymer useful for laser printing and to produce laser mailers.

BACKGROUND OF THE INVENTION

Conventional mailers are a series of connected, stuffed, sealed envelopes which are made from continuous webs of paper by a forms manufacturer. Information common to all of the envelope assemblies are printed on the webs. These assemblies are zig-zag folded and shipped to a large user who employs computerized impact printers to print the name of the recipient on the envelope and to enter certain confidential entries through the envelope onto the interior plies. The assemblies are separated one from another and mailed to customers. A basic mailer is described in U.S. Pat. No. 3,104,799 to Steidinger. Other variations are described in U.S. Pat. Nos. 4,095,695 to Steidinger and 4,102,251 to Steidinger. During manufacture of mailer assemblies, glue lines, dots, or patterns are applied along the open edges of the mailer forms to seal the envelope. The glue application operation is messy at times, especially at the beginning and during any stoppage.

More recently, there has been a need for a mailer form in business system and promotional applications, using a single message-ply processed by non-impact printers, such as a laser printer. The ply is then folded and glued along open edges to become a mailer. Several types of laser mailers are disclosed in U.S. Pat. Nos. 4,754,915 to Steidinger, 4,889,278 to Steidinger, 4,944,449 to Schmidt, and 5,095,682 to Steidinger, the disclosures of which are hereby incorporated by reference.

Laser mailers are designed to be processed by advanced, computer-controlled, non-impact laser printers. In the printer, a laser beam of light produces a latent electrostatic image on photoconductor cylinder or drum. As the cylinder or drum is rotated, the negatively charged toner particles jump from the magnetic brush to the positively charged parts of the photoconductor cylinder due to electrostatic interaction. The imaged photoconductor cylinder continues to rotate and transfer the toner particles to a paper web which has been positively charged higher than that of the photoconductor cylinder by a transmission corona. The toner image on the paper is then fused into the paper by passage through a pair of rolls which provide heat and pressure to form bonded images on the paper web.

An untreated surface of a paper web has poor receptivity for the fused toner particles, and the images may be rubbed off totally or partially. When used for printing security documents, addresses, prices, bar codes, identification numbers, serial numbers, invoices, etc., the laser printing may become illegible or the object of fraud.

Several prior patents have disclosed various means to enhance toner anchorage to substrates. For example, U.S. Pat. No. 2,855,324 to Van Dorn discloses coatings of thermoplastic resin having melting points between 150° F. and 300° F. (such as polyethylenes, polyamides, and polystyrene) to improve xerographic toner transfer. U.S. Pat. No. 3,130,064 to Insalaco discloses coating a record card with a film by immersing in a thermoplastic solution, such as a toluene solution of styrene-n-butylmethacrylate copolymer, to improve xerographic toner adhesion. U.S. Pat. No. 4,254,201 to Sawai et al. discloses use of porous aggregates which contain encapsulated pressure-sensitive adhesive as individual granules and pigment particles in the interstices between the granules to improve the toner adhesion on the substrate for use in electrostatic photography. U.S. Pat. No. 4,499,168 to Mitsuhashi discloses addition of vinyl-type polymer to toner particles to improve the adhesion in a xerographic process. U.S. Pat. No. 4,510,225 to Kuehnle et al. discloses coating thermoplastic polymer, such as polyester, polyacrylate, polyvinyl buryral, polyvinyl formal, polyvinyl acetate, copolymer of vinyl acetate-vinyl chloride, copolymer of vinylidene chloride acrylonitrile, polyethylene, and polypropylene, on a substrate to enhance the toner adhesion in electrostatic reproduction. U.S. Pat. No. 5,045,426 to Maierson et al. discloses coating a cellulosic web product with a copolymer of styrene and acrylic acid having a glass transition temperature of between about −16° and 22° C. to enhance laser toner adhesion, and the toner is fused to the web surface by the application of heat and pressure.

During manufacture, the laser printed ply is folded and glued to form a mailer. Glue applicators are used to lay down continuous glue lines in the vertical margins (i.e., longitudinal margins) of the mailer form and dot patterns (or lines) of glue in places across the width (i.e., latitudinal margins) to seal the laser mailer. However, as is the case with impact printed mailers, problems with glue application exist in the production of laser mailers. To prevent the water-based glue from overflowing, glue lines are applied off the open edges, resulting in slightly open margins after the mailer is sealed.

SUMMARY OF SHE INVENTION

A dual-functional coating has now been discovered which not only enhances toner anchorage to business forms, such as laser mailer forms, but, in addition, renders the form self-adhering thereby eliminating the need for messy glue application and glue applicators during production of the mailers.

Surprisingly, it has been discovered that coating at least one surface of a business form with a dual-functional coating of a copolymer of ethylene and vinyl acetate containing at least 40 weight percent ethylene and having a softening point of at least 60° C., the dual-functional coating is not only capable of enhancing anchorage of toner particles, but renders the form self-adhering under application of heat and pressure, thus eliminating the need for extraneous adhesives.

According to a preferred embodiment of the present invention, a self-adhering mailer form is provided comprising a sheet having at least one surface bearing a coating comprising a copolymer of ethylene and vinyl acetate containing at least 40 weight percent ethylene and having a softening point of at least 60° C. The coated surface of the laser mailer form exhibits excellent reception for laser toner. The copolymer also performs as an adhesive activatable by heat in the folding machine used to convert the laser mailer form to a laser mailer.

According to another embodiment of the present invention, a method for printing a mailer form is provided, which comprises applying toner in the form of an image to a coated surface of a mailer form comprising a sheet having at least one surface coated with a dual-functional coating of a copolymer of ethylene and vinyl acetate, the copolymer containing at least 40 weight percent ethylene and having a softening point of at least 60° C., and fusing the toner particles to the surface of the substrate by application of heat and pressure. The toner particles can be applied, softened and become fused to the dual-functional copolymer coating in a laser printer.

According to a still further embodiment of the present invention, a method for printing and sealing a laser mailer form is provided, which comprises applying toner in the form of an image to a sheet comprising a substrate having at least one surface bearing a coating comprising a copolymer of ethylene and vinyl acetate, the copolymer containing at least 40 weight percent ethylene and having a softening point of at least 60° C., fusing the toner to a coated surface of the substrate by application of heat and pressure in a laser printer or in a copy device, folding the sheet on itself, and applying heat and pressure to a peripheral portion of the folded sheet in a folding device to fuse the copolymer coating and adhere the sheet to itself.

In this manner a self-adhering mailer form is provided without the need for any application of glue or adhesive, since the mailer form can be merely heated with pressure while folding at peripheral portions of the folded mailer forms to cause a softening and fusing of the copolymeric coating so as to seal the mailer.

Although the copolymeric coating of the present invention is "dual-functional", since it can both enhance toner anchorage and provide a self-adhering form, such as a laser mailer form in particular, it is understood that business forms of the present invention can be used taking advantage of only one of dual functions. For example, toner anchorage can be improved using the coated form of the present invention without heating portions of the form to seal it or by adding extraneous glue for sealing purposes. Likewise, the coated form of the present invention can be used, for example, as a mailer form with impact printers and sealed by application of heat and pressure, but without any application of extraneous glue or adhesive. Thus, although a preferred use of the present invention is to form a single sheet laser mailer in which the copolymeric coating is used to both enhance toner anchorage and provide a self-adhering laser mailer form, the business form of the present invention can be used for other business forms, including negotiable instruments, labels, etc.

BRIEF DESCRIPTION OF THE DRAWINGS

Referring now to the drawings which form a part of the original disclosure.

DETAILED DESCRIPTION OF THE INVENTION

As used in the present application, the expression "business form" includes mailer forms; negotiable instrument forms, such as check forms; labels; security forms; documents used in laser printers; etc.

Figure 1:
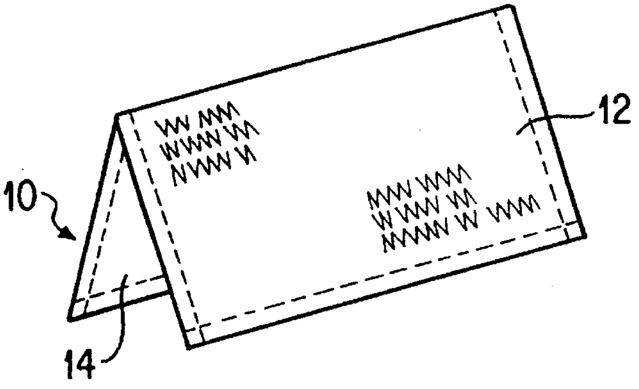
FIG. 1 is a perspective view of a partially folded mailer produced in accordance with the present invention.

For purposes of illustration, the following description will be limited to laser mailer forms and their production. Referring to FIG. 1 of the drawings, mailer 10 is a laser mailer form constructed according to the present invention and is a unitary sheet of paper that has been coated on both sides with the dual-functional copolymer of the present invention prior to printing the sheet in a laser printer and folding the sheet to the position illustrated in FIG. 1.

The copolymers useful in the present invention are ethylene-vinyl acetate copolymers containing at least 40 weight percent, preferably 40 to 90 weight percent ethylene, preferably 60 to 82 weight percent, and 10 to 60 weight percent vinyl acetate, most preferably 18 to 40 weight percent. The heat activatable copolymers have a softening point of at least about 60° C., preferably from about 60° C. to about 150° C., most preferably between 80° C. to 120° C. Methods for preparing such copolymers are well known. Suitable copolymers are commercially available under the tradename "Elvax" from DuPont Chemicals Company, EVA from Union Carbide Corporation, and UE from U.S. Industrial Chemicals Company. "Elvax 150" from DuPont Company is preferred.

In preparing a coating, ethylene-vinyl acetate copolymer is preferably melted together with a hydrocarbon resin and a hydrocarbon wax. The resulting molten mixture is then emulsified under agitation into an aqueous solution of an emulsifier to a particle size of about one to about 20 microns in diameter to provide an aqueous dispersion for coating. Suitable amounts of each component in parts by weight include, for example, between about 80 and about 20, preferably between about 70 and about 30 parts, ethylene-vinyl acetate copolymer, between about 20 and about 80, preferably between about 30 and about 70 parts of hydrocarbon resin, between 0 and about 80, preferably between 0 and about 70 parts of wax, and between about 10 and about 50, preferably between about 15 and about 35 parts emulsifier.

The hydrocarbon resin is mixed with the ethylene-vinyl acetate copolymer to aid in forming the aqueous dispersion. Thus, any suitable hydrocarbon resin may be used, particularly aliphatic hydrocarbon resins. Suitable hydrocarbon resins are available, for example, from Exxon Chemical Company under the tradename "Escorez 1304" Hydrocarbon Resin, which is a hydrocarbon resin containing linear, branched and cyclic structures of an aliphatic nature, and "Escorez 2101" Hydrocarbon Resin, which is an aromatic-aliphatic hydrocarbon resin. Other suitable hydrocarbon resins are available from Neville Chemical Company as Nevtac Resin and Super Nevtac Resin; from Hercules, Inc. as Picco Resin, Piccodiene Resin, Piccofyn Resin, Piccolastic Resin, Piccolyte Resin, Piccomer Resin, Piccopale Resin, Piccotex Resin, and Piccovar Resin; and from Shell Chemical Company as Super Sta-Tac Hydrocarbon Resin. Any suitable hydrocarbon waxes may be utilized including paraffin wax and microcrystalline wax.

Suitable emulsifiers include starch, hydroxyethyl cellulose, methyl cellulose, gelatin, casein, gum arabic, polyvinyl alcohol, polyvinylpyrrolidone, styrene-maleic anhydride copolymers, ethylene-acrylic acid copolymers, styrene-butadiene copolymers, acrylonitrile-butadiene copolymers and vinyl acetate emulsions.

An aqueous dispersion of the copolymer of the present invention may be used to coat paper or other substrate, such as polyolefins, available as "Tyvek" from DuPont Company, "Teslin" from PPG Industries, Inc., or the like. The coating is then dried by any conventional means such as a hot air drier, infrared heat drier or microwave drier, at a web temperature under 80° C. at atmospheric pressure.

The dry coating is not pressure-sensitive. The copolymer is applied to the substrate at a dry coat weight of from about 0.5 to about 2.0 pounds, preferably from about 0.75 to about 1.5 pounds per 1300 square foot area. The amount of dry coating is light compared to between about 5 pounds to about 10 pounds per 1300 square foot area for a conventional hot-melt adhesive coating.

The copolymer useful in this invention is heat softenable and contains a resin binder which adheres the copolymer to the substrate. Conventional laser toner also contains a heat softenable resin binder. When the substrate coated with the copolymer comes into contact with the heated fuser rolls of the laser printer, the softened laser toner particles are then bonded to the coating under pressure, forming images which are smudgeproof at ambient temperatures.

The light coating of the copolymer in this invention requires heat and pressure to achieve a strong bonding when used as an adhesive in laser mailer. A heavy coating of ethylene-vinyl acetate copolymer is not desirable because the heat activatable adhesive can be picked up by the fuser roll, causing adhesive buildup which blurs the laser images.

Referring again to FIG. 1, laser mailer 10 is a single ply laser mailer form provided with a single fold line dividing the sheet into panels with address panel 12. As shown more specifically in FIG. 2, which illustrates the mailer form of FIG. 1 in an open and flat position, panel 12 is provided with addressee information 16 provided with by a laser printer and will become the face of the mailer. Positioned above panel 12 is panel 14, which will become the back of the mailer, when the form is folded along fold line 18.

Figure 3:
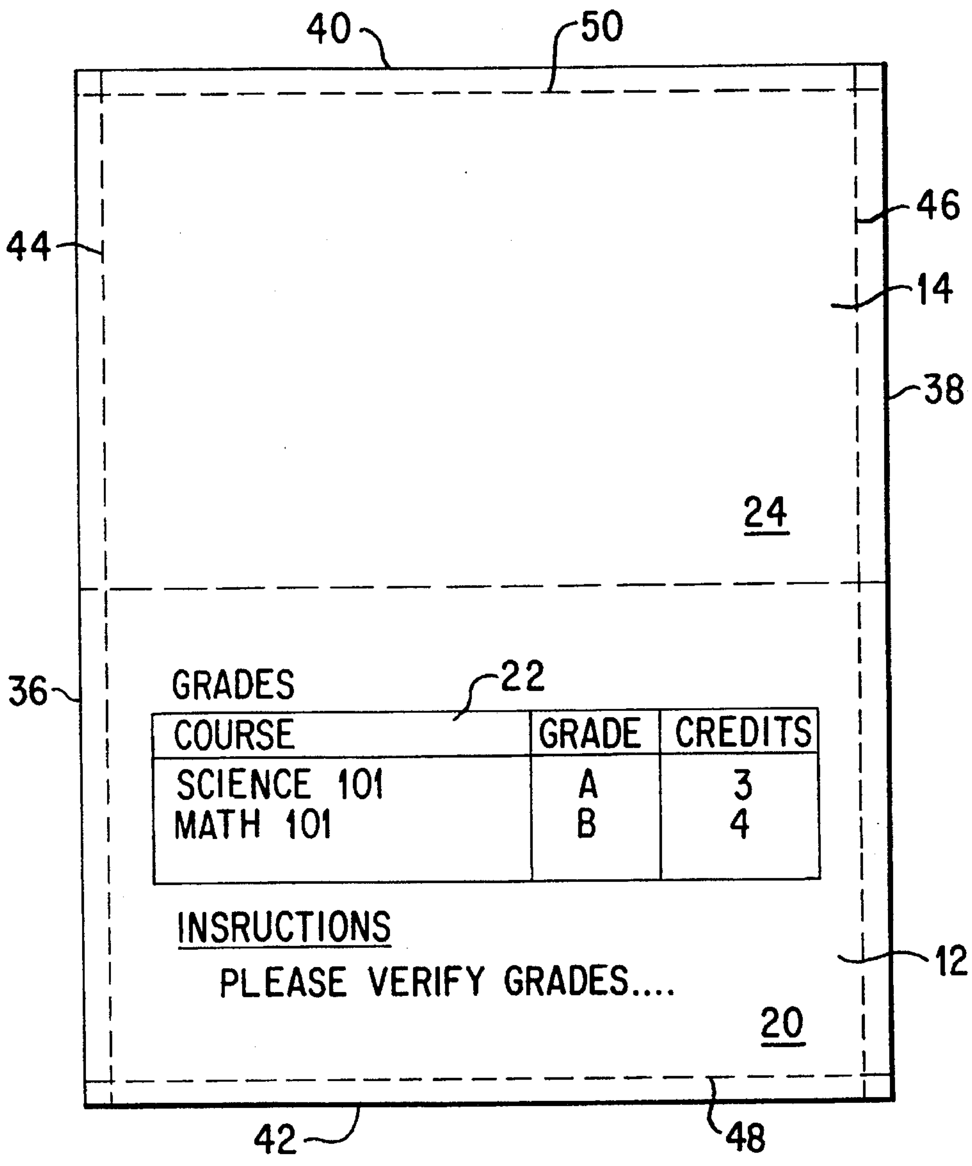
FIG. 3 is a plan view of the reverse side of the unfolded mailer of FIG. 2 showing a message panel.

The reverse side of panels 12 and 14 is shown in FIG. 3, in which panel 12 is provided with confidential information 22, such as school course grades, by means of a laser printer, if desired, or may be preprinted by means of other printing techniques. Surface 24 of panel 14 is also available as a message panel. Surface 20 of panel 12 with confidential information 22, as well as surface 24 of panel 14 will be hidden from view when mailer 10 is sealed. Panels 20 and 24 were also precoated with the dual-functional copolymer coating of the present invention prior to printing.

Figure 2:
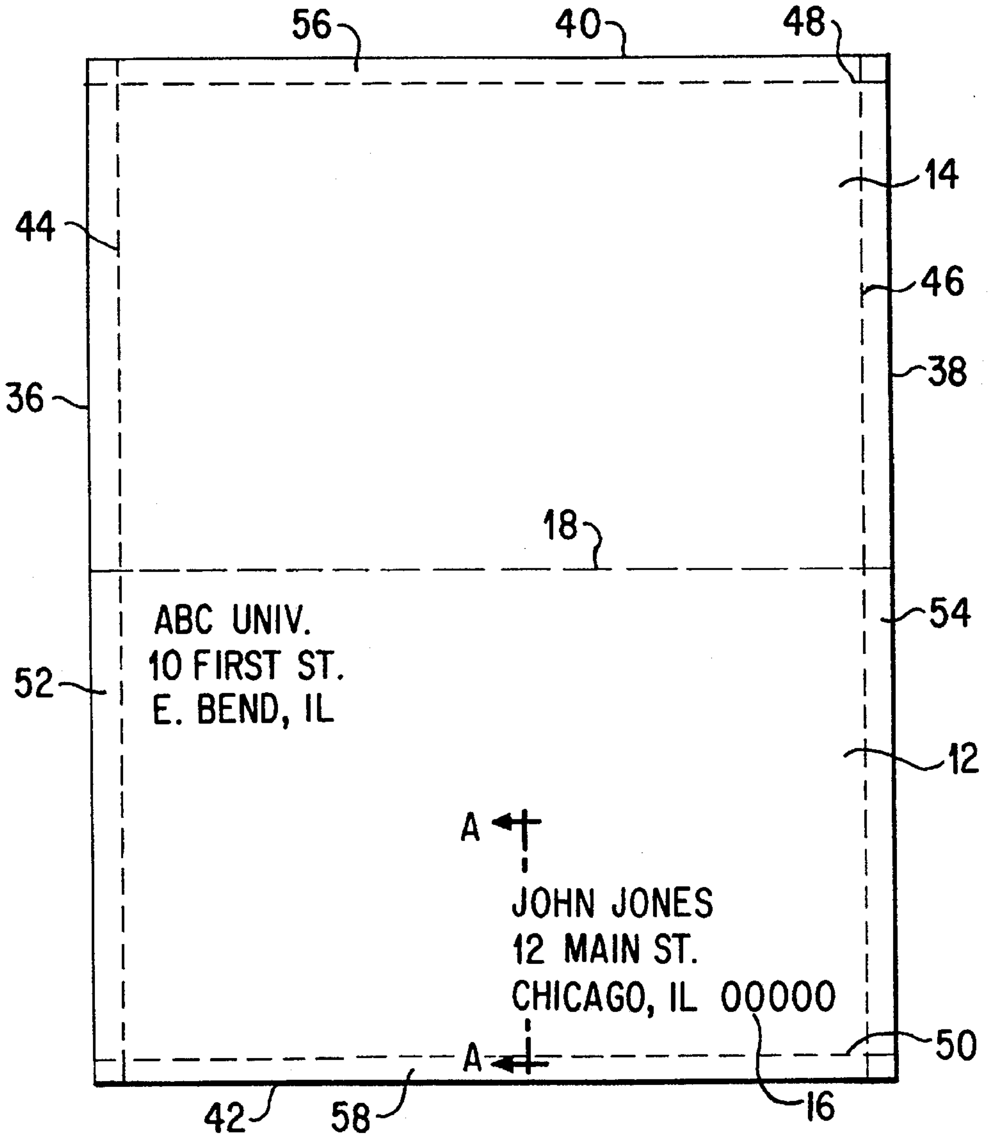
FIG. 2 is a plan view of the unfolded mailer of FIG. 1 showing the address panel.
Figure 4:
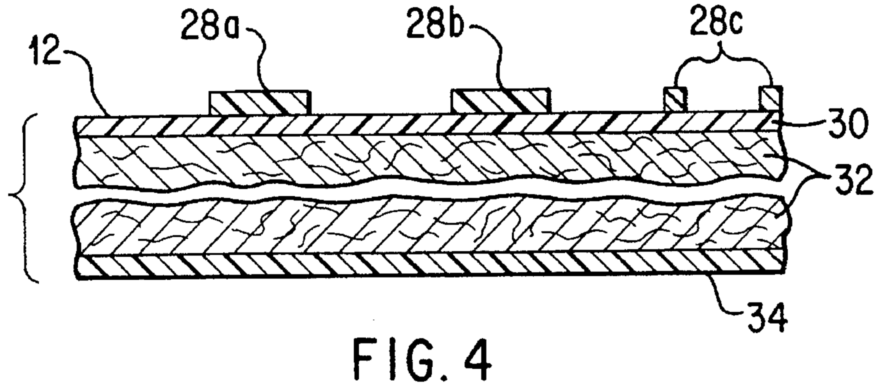
FIG. 4 is a fragmented side elevational view of the coating of the present invention in the address portion in section taken along line A—A of FIG. 2.

FIG. 4 is a fragmentary, cross-sectional view of a portion of panel 12 along line A—A in FIG. 2. As seen in FIG. 4, laser toner 28*a*, 28*b* and 28*c* forms a portion of the addressee information and is bonded or fused to copolymeric coating 30, which, in turn, is bonded to paper substrate 32. Likewise, copolymeric coating 34 is bonded to the opposite side of paper substrate 32.

Figure 5:
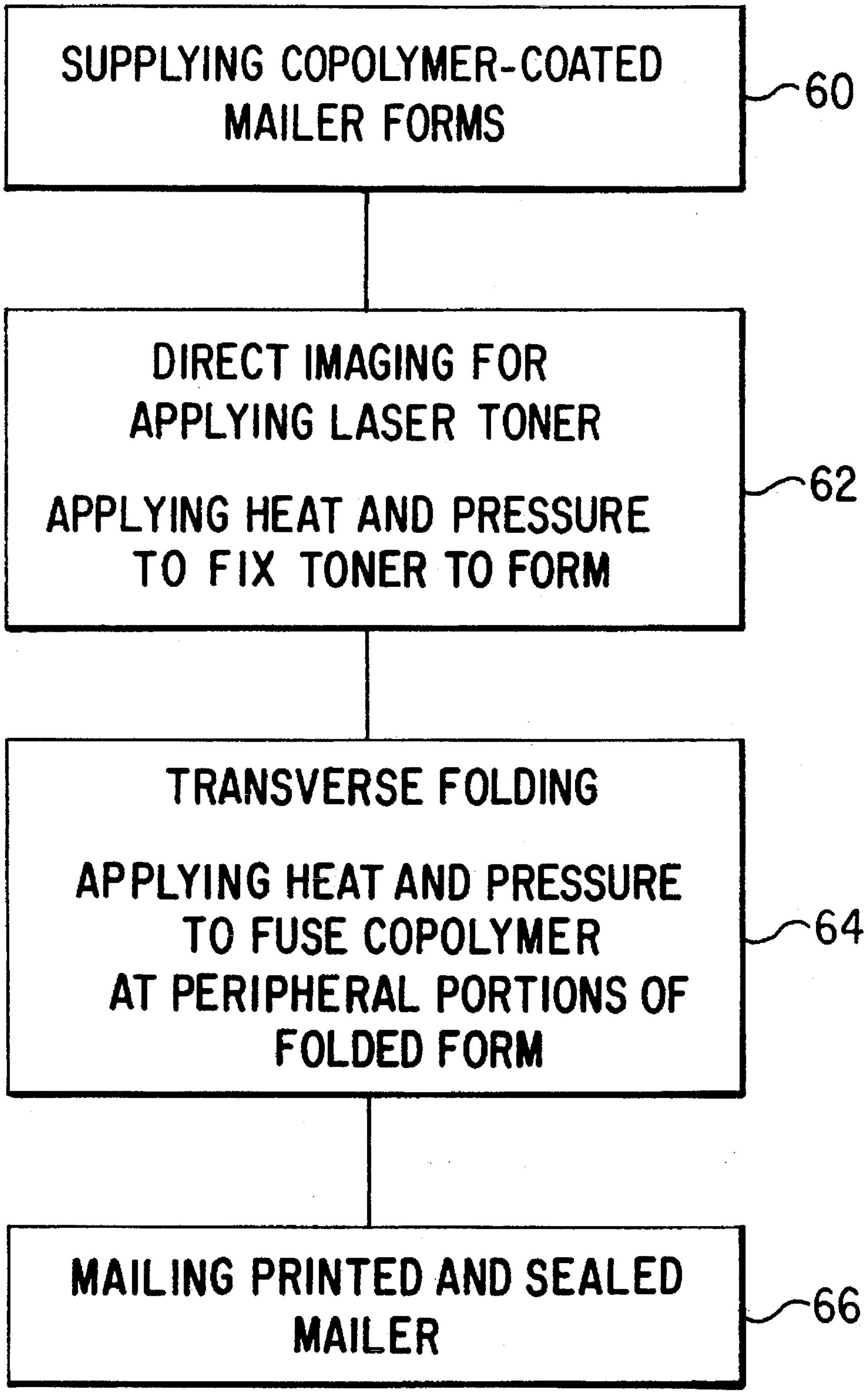
FIG. 5 is a schematic diagram of an embodiment of the method for practicing the present invention.

FIG. 5 illustrates an overview of the process according to the present invention in which single ply mailer forms coated on one or both sides with the dual-functional copolymer of the present invention are supplied at station 60. The coated mailer form can be in the form of a continuous web, as from a roll or zig-zag folded stack, or may be supplied as a stack of cut sheets, as are supplied to certain laser printers. The coated mailer forms are passed to station 62 where the coated forms are subjected to a laser printer or electrostatic photography for application of toner to the copolymer-coated surface of the mailer form including address information and message information, and heat and pressure are applied to fix the toner to the coated form.

Next, the printed mailer form, such as that depicted in FIGS. 2–3, is passed to folding/sealing station 64 where the form is folded and then subjected to application of heat and pressure at peripheral portions of the folded mailer to seal the mailer by fusing portions of the copolymer coating to itself. Optionally, station 64 employs a folding machine which folds and then heats and applies pressure to the folded mailer form by means of heated bars along transverse portions (parallel to the fold line) of the folded mailer, and by means of heated wheels along the side margins (transverse to the fold line). Folding machines equipped with such heating and pressure means are commercially available, for example, such as "Multiseal Model No. 2320" from Mathias Bauerle GmbH. The mailer form is sealed by applying heat at a temperature in the range of from about 125° F. (51.67° C.) to about 245° F. (118.3° C.), preferably from about 175° F. (79.45° C.) to about 195° F. (90.56° C.), while applying pressure of from about 20 to about 50 psi, preferably from about 25 to about 40 psi. If desired, any pressure can be applied up to that which would cause the web to break. The sealed mailer is the mailer as indicated at station 66. Incorporation of the hydrocarbon resin in the copolymer coating composition improves toner acceptance and reduces the temperature required to seal the form.

Heat and pressure can be applied to tear-off stubs on the folded mailer. Thus, for example, referring again to FIG. 2, mailer 10 has two side edge portions 36 and 38 and two end edge portions 40 and 42. Located adjacent, but slightly inward of said edge portions, are lines of perforation 44, 46, 48 and 50 defining tear off stubs 52, 54, 56 and 58. Mailer 10 is sealed by application of heat and pressure to the folded mailer form to the tear off stubs 52, 54, 56 and 58 between the lines of perforation 44, 46, 48 and 50, and the edge portions 36, 38, 40, and 42. Application of heat and pressure to the tear stubs causes bonding of the copolymer coated on panel 20 of FIG. 3 in the area between edge portions 36, 38 and 42 and lines of perforation 44, 46 and 50, with the copolymer coating of panel 24 between end portions 36, 38 and 40 and lines of perforation 44, 46 and 48.

In this manner mailer 10 may be sealed without applying any glue or adhesives to the mailer tear-off stubs. Likewise, messy glue applicating equipment can be eliminated. The sealed mailer may be opened by merely tearing off and disposing of the tear-off stubs.

Figure 6:
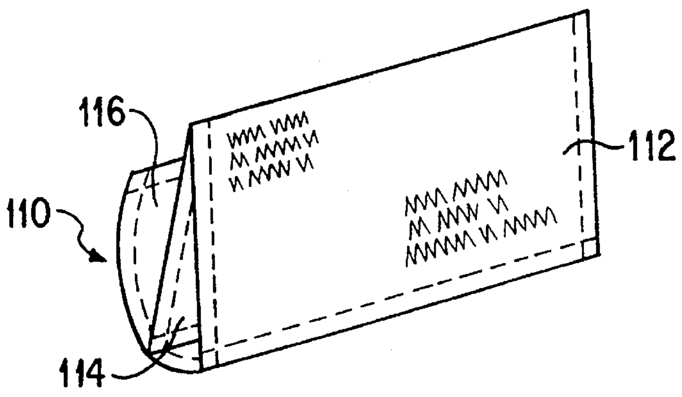
FIG. 6 is a perspective view of a double folded mailer in accordance with the present invention.
Figure 7:
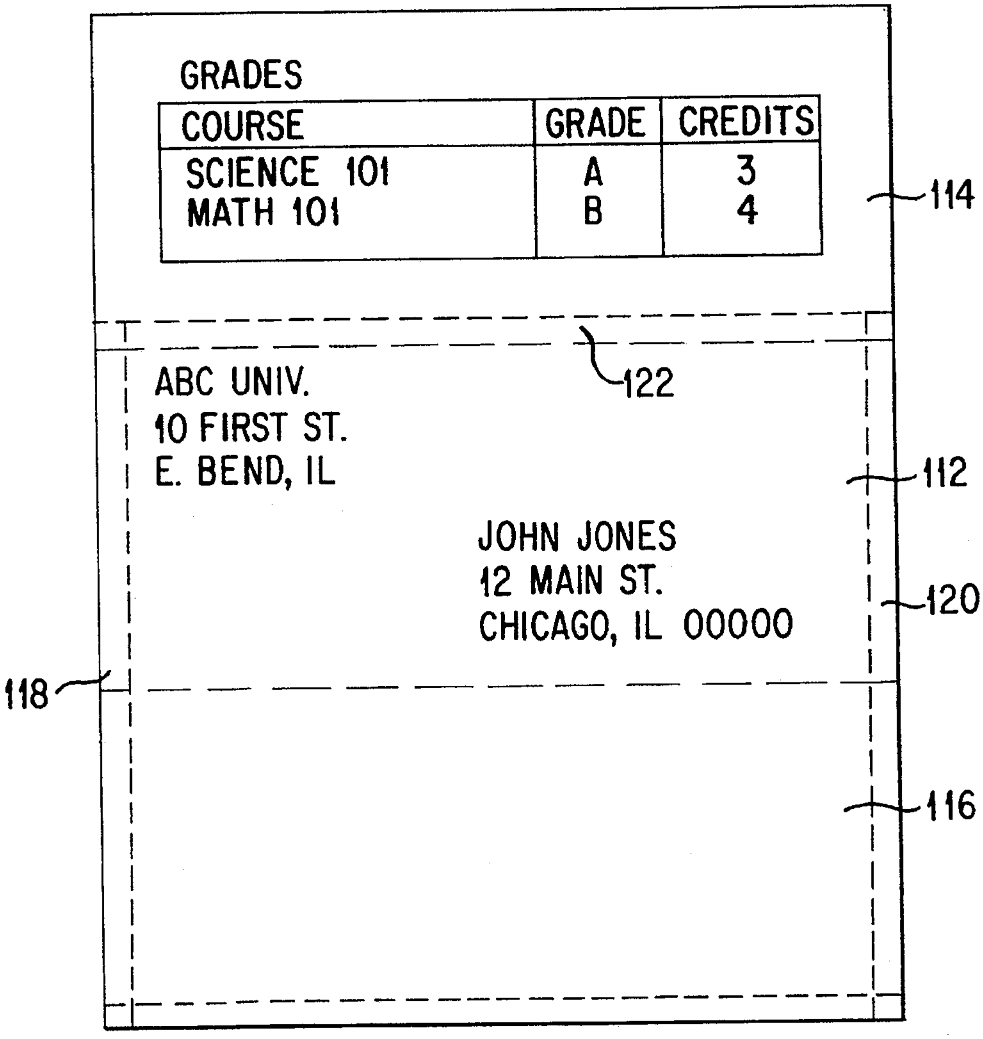
FIG. 7 is a plan view of the outside of the unfolded mailer of FIG. 6 showing the address and message panels.
Figure 8:
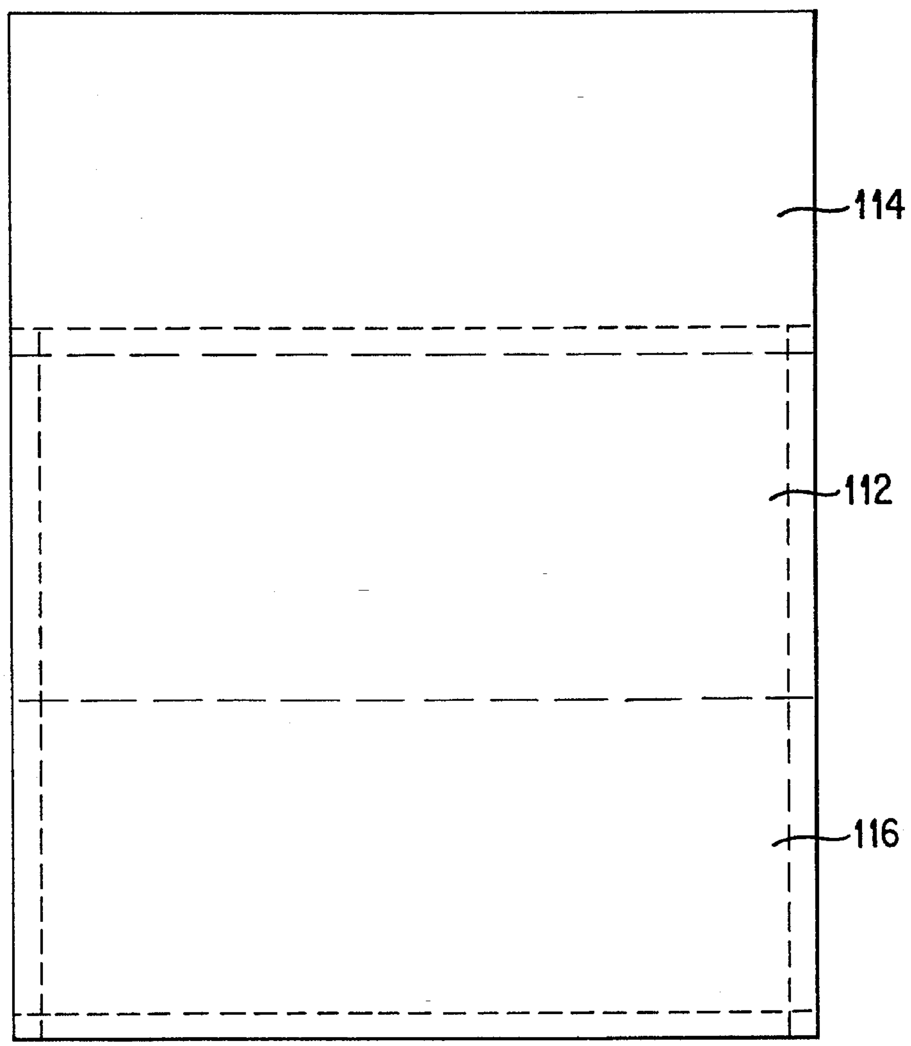
FIG. 8 is a plan view of the reverse side of the unfolded mailer of FIG. 7.

The folding of the laser form in folding station 64 of FIG. 5 may be in one direction, as shown in FIG. 1. FIG. 6 illustrates another mailer form 110, which is coated on both sides with the dual-functional copolymer coating of the present invention, and as shown in FIG. 7, middle panel 112 is provided with address information and will become the face of the mailer when folded. Upper panel 114 is the message panel and contains confidential grade information, while lower panel 116 will become the back of the mailer. FIG. 8 illustrates the reverse side of form of FIG. 7.

Heat and pressure applied to the folded mailer on the address surface of panel 112 by means of heated wheels along and within the side tear-off stubs 118 and 120 and by heated bars along the transverse tear-off stub 122 will cause fusion between the copolymer coatings on the adjacent panels in the area of the tear-off stubs.

Figure 9:
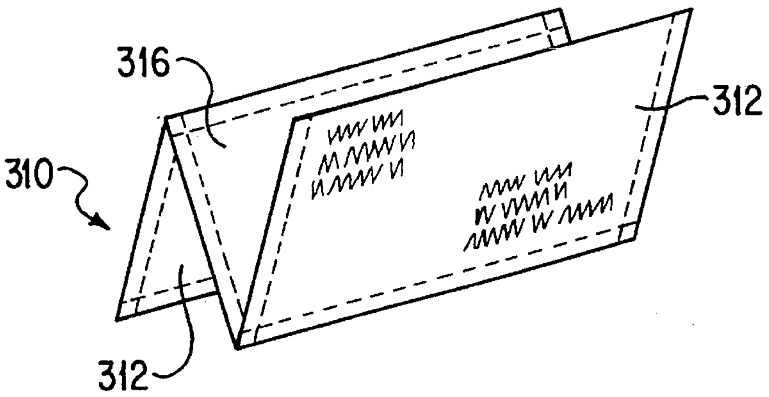
FIG. 9 is a perspective view of a zig-zag folded mailer in accordance with the present invention.

FIG. 9 shows a zig-zag folding arrangement for a laser mailer 310 in which the copolymer coating of the present invention is coated on both sides of the form.

Figure 10:
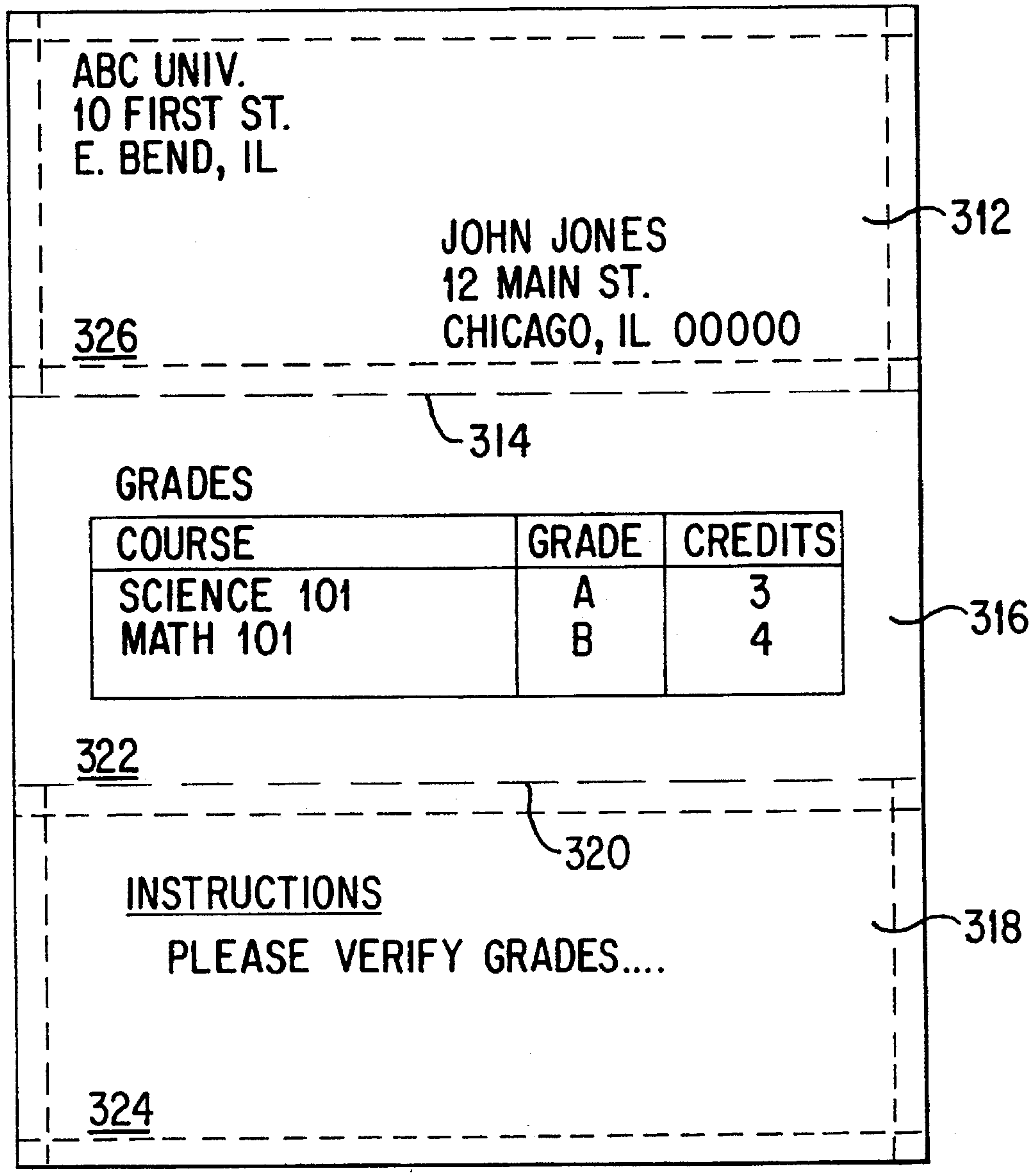
FIG. 10 is a plan view of the unfolded mailer of FIG. 9 showing the address panel and message panels.
Figure 11:
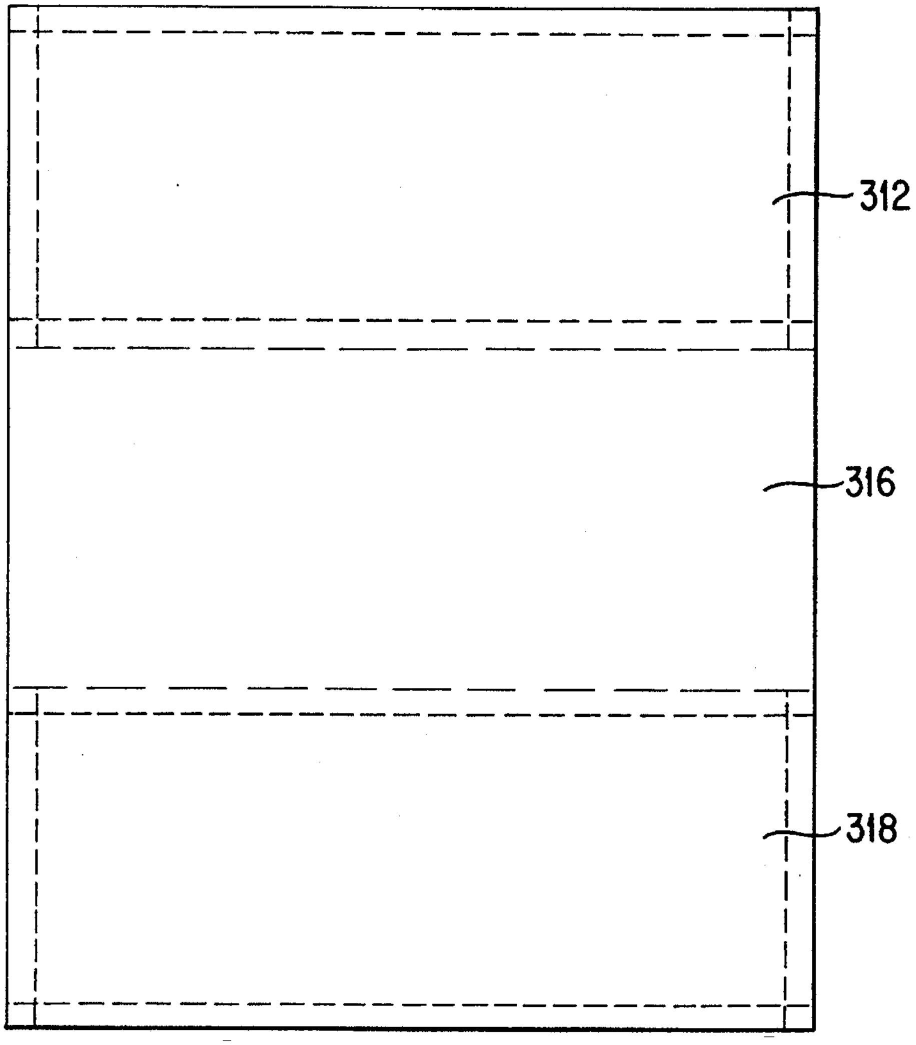
FIG. 11 is a plan view of the reverse side of the unfolded mailer of FIG. 10.

As shown in FIG. 10, the uppermost panel 312 becomes the face of the mailer when folded along fold line 314, while message panels 316 and 318 become folded so as to have surfaces 322 and 324 face each other when panels 316 and 318 are folded along fold line 320, and thereby retain as confidential the information printed thereon. FIG. 11 shows the reverse side of the sheet of FIG. 10.

The folded mailer is heat sealed in the manner described for the mailer of FIGS. 6–8, but by applying heat and pressure to surface 326 of face panel 312 along and within all four of the tear-off strips forming the periphery of surface 326.

Figure 12:
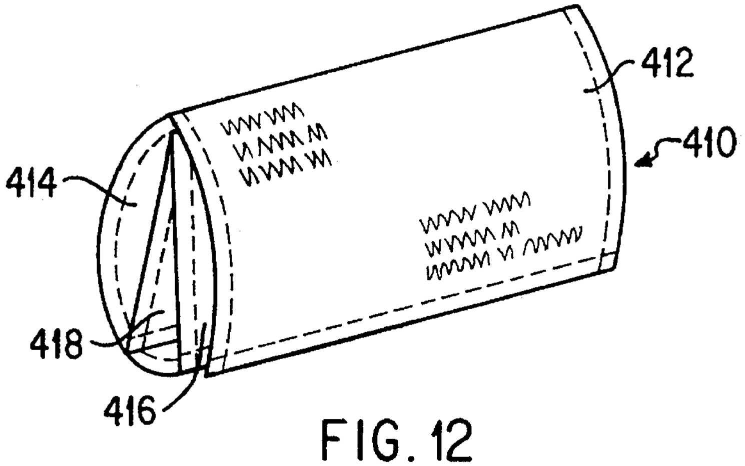
FIG. 12 is a perspective view of another folded mailer in accordance with the present invention.
Figure 13:
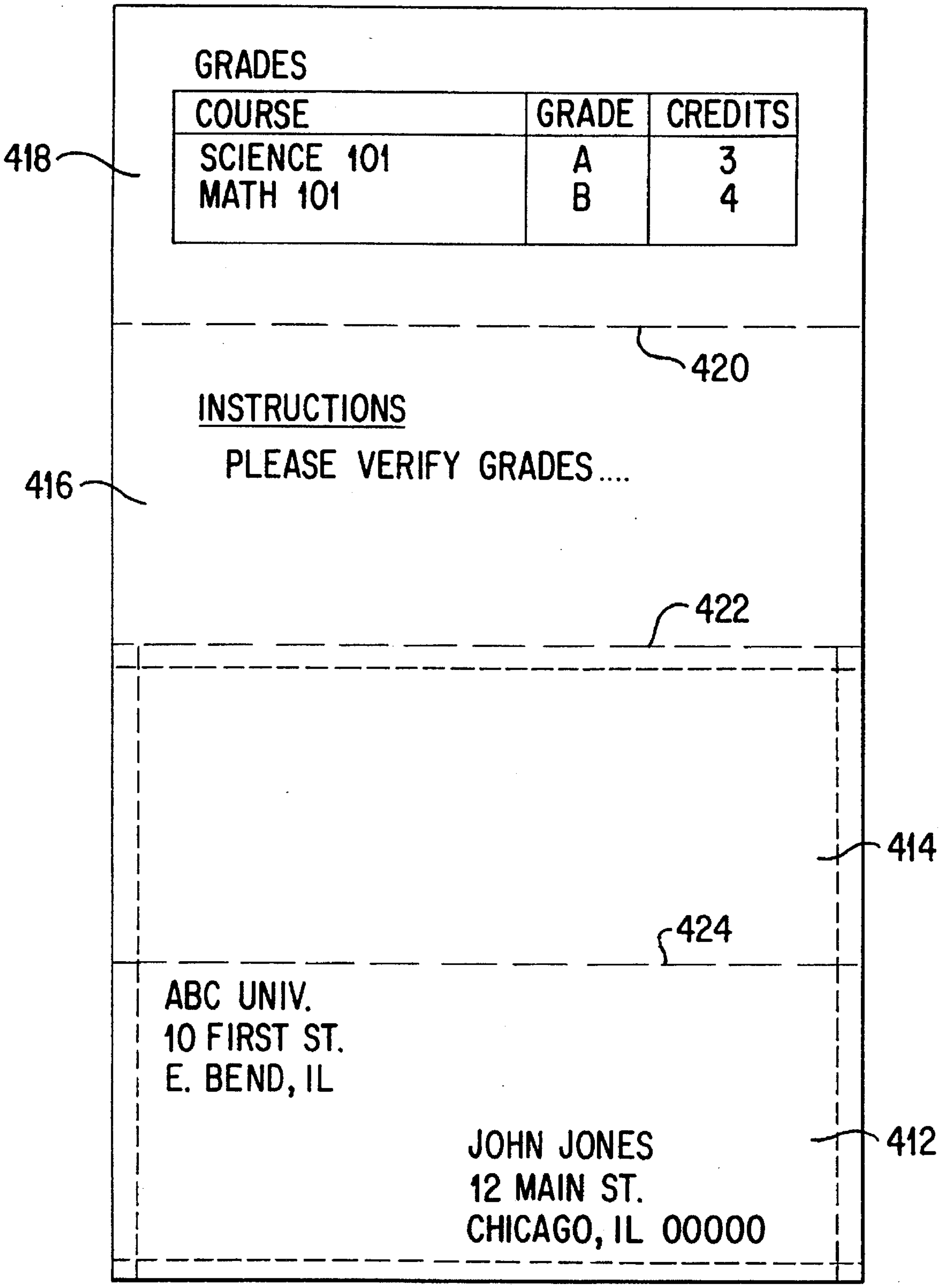
FIG. 13 is a plan view of the unfolded mailer of FIG. 12 showing the address and message panels.
Figure 14:
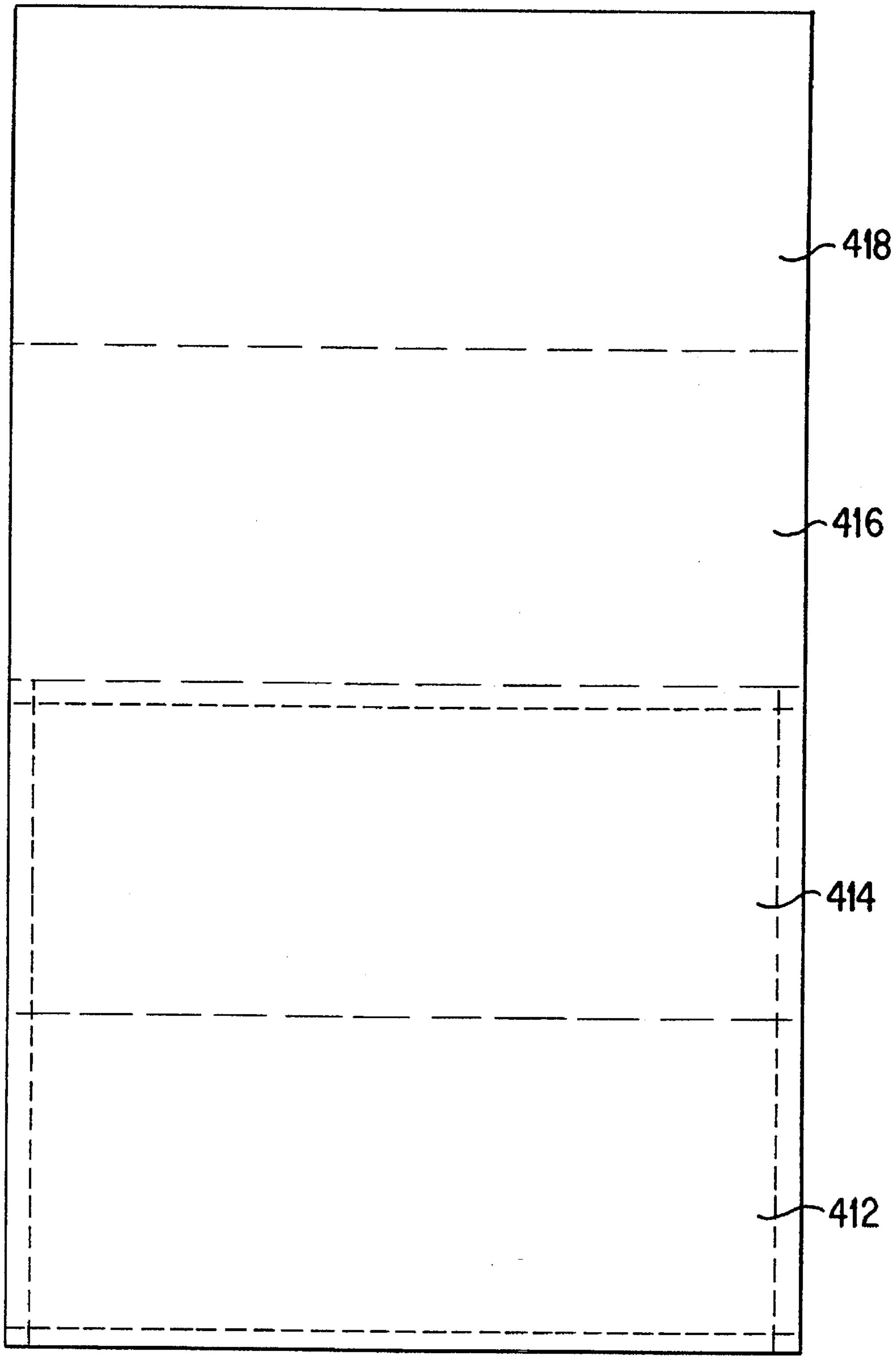
FIG. 14 is a plan view of the reverse side of the unfolded mailer of FIG. 13.

FIG. 12 shows mailer 410 in which the mailer form is continuously folded over onto itself as one would wind an element. The mailer form 410 folded as shown in FIG. 12 requires a coating of the copolymer of the present invention on the surface shown in FIG. 13, as well as the reverse surface shown in FIG. 14. In the arrangement of FIG. 13, the address panel 412 is disposed beneath back panel 414 followed by bifold message panels 416 and 418. The mail form in FIG. 13 is folded by first placing panel 418 behind panel 416 along fold line 420, then folding again in the same direction along fold line 422 and then fold line 424. This results in panel 414 becoming the back panel and panel 412 the face panel. The message panels are safely inside, and the mailer form is sealed as before by applying heat and pressure along the tear-off stubs to cause the copolymer coating on adjacent surfaces to fuse in the tear-off stub areas.

The coating composition of this invention is shown in the following example. All parts and percentages are by weight.

EXAMPLE

A mixture of 7.0 parts of Elvax 150 (a copolymer of 67% ethylene and 33% vinyl acetate, manufactured by DuPont Company), 3.0 parts of Piccolastic A75 resin (a low molecular weight styrene thermoplastic hydrocarbon resin, manufactured by Hercules Incorporated), and 7.0 parts of paraffin wax is melted and stirred at 100° C. until a clear molten phase is obtained. The hot liquid is emulsified into 16.5 parts of a 10 percent polyvinyl alcohol aqueous solution at 80° C. After the temperature is gradually reduced to the ambient temperature, 1.6 parts of SE 21 defoamer (a silicone defoamer at 40 percent solids from Wacker Silicone Corporation) are then added. The total solids of the resulting ethylene-vinyl acetate copolymer dispersion is 55 percent solids.

Twenty-eight parts of the ethylene-vinyl acetate copolymer dispersion at 55 percent solids, 8 parts of glycerol, 0.6 part of an anti-static agent, one part of silicone defoamer, and 8 parts of calcium carbonate powder are mixed into 20 parts of water.

The resulting material is fully coated on a paper substrate, using an offset gravure coater. After drying, the resulting material is further coated on the other side of the paper substrate on the same coater. The resulting coat weight is one pound per 1300 square foot area.

A coated sheet of 8½×11" is cut from the paper substrate and fed into a Hewlett-Packard laser printer. The laser toner adheres tightly on the coated surface. The laser-printed sheet is then fed into a folding machine for laser mailer, equipped with heated wheels and bars. The sealed edges cannot be opened without tearing the paper.

Although the invention has been described with a certain degree of particularity, it is understood that the present disclosure has been made only by way of example, and that numerous changes on the details of construction and the combination and arrangement of parts may be resorted to without departing from the spirit and scope of the convention. Thus, the scope of the invention should not be limited by the foregoing specification, but rather, only by the scope of the claims appended hereto.

What is claimed is:

1. A business form comprising a substrate with at least one surface bearing a dual-functional coating which comprises a copolymer of ethylene and vinyl acetate, said copolymer containing at least 40 weight percent ethylene and having a softening point of at least 60° C., said dual-functional coating capable of enhancing adhesion of toner particles and being self-adhering under application of heat and pressure.

2. The business form of claim 1, wherein said business form comprises a self-adhering mailer form.

3. The business form of claim 1, wherein two opposing surfaces of the substrate are coated with said dual-functional coating.

4. The business form of claim 1, wherein said dual functional coating comprises said copolymer in admixture with a hydrocarbon resin.

5. The business form of claim 4, wherein said dual functional coating contains between about 80 and about 20 parts by weight of said copolymer and between about 20 and about 80 parts by weight of said hydrocarbon resin.

6. The business form of claim 4, wherein said admixture additionally contains a hydrocarbon wax in an amount of from 0 to about 80 parts by weight.

7. The business form of claim 1, wherein said dual-functional coating is coated on said substrate at a coat weight of from about 0.5 to about 2.0 pounds per 1300 square feet of area.

8. The business form of claim 1, wherein said substrate is a cellulosic material.

9. The business form of claim 1, wherein toner particles are adhered to said dual-functional coated surface.

10. A business form according to claim 1, wherein said substrate comprises a series of perforations adjacent to but spaced from a marginal edge of said substrate to define marginal portions between said perforations and said marginal edge, said substrate being folded such that said marginal portions and said coating thereon are superposed and are adhered by heat and pressure.

11. A business form according to claim 1, wherein said substrate is folded such that said coating on marginal portions of said substrate are superposed and are adhered by heat and pressure.

12. A business form according to claim 11, wherein toner is fused to said coating in areas thereof spaced from said marginal portions.

13. The business form of claim 1, wherein said substrate is a polyolefin.

14. A self-adhering mailer form suitable for non-impact computer printers, which comprises a substrate having at least one surface coated with a dual-functional coating comprising a copolymer of ethylene and vinyl acetate, said copolymer containing at least 40 weight percent ethylene and having a softening point of at least 60° C.

15. The mailer form of claim 14, wherein said dual functional coating comprises said copolymer in admixture with a hydrocarbon resin.

16. The mailer form of claim 15, wherein said dual functional coating contains between about 80 and about 20 parts by weight of said copolymer and between about 20 and about 80 parts by weight of said hydrocarbon resin.

17. The mailer form of claim 16, wherein said admixture additionally contains a hydrocarbon wax in an amount of from 0 to about 80 parts by weight.

18. The mailer form of claim 14, wherein said dual-functional coating is coated on said substrate at a coat weight of from about 0.5 to about 2.0 pounds per 1300 square feet of area.

19. The mailer form of claim 14, wherein said substrate is a cellulosic material.

20. The mailer form of claim 14, wherein toner particles are adhered to said dual-functional coated surface.

21. The mailer form of claim 14, wherein said substrate comprises a series of perforations adjacent to but spaced from a marginal edge of said substrate to define marginal portions between said perforations and said marginal edge, said substrate being folded such that said marginal portions and said coating thereon are superposed and are adhered by heat and pressure.

22. The mailer form according to claim 14, wherein said substrate is folded such that said coating on marginal portions of said substrate are superposed and are adhered by heat and pressure.

23. The mailer form of claim 22, wherein toner is fused to said coating in areas thereof spaced from said marginal portions.

24. The mailer form of claim 14, wherein said substrate is a polyolefin.

25. A self-adhering mailer which comprises a substrate having at least one surface coated with a dual-functional polymeric coating which has a softening point of at least 60° C., said form having toner particles adhered to said dual-functional coating, said substrate being folded such that marginal portions of said substrate having said dual-functional coating thereon are superposed and are adhered by heat and pressure.

* * * * *